Aug. 26, 1958  G. H. ROYER ET AL  2,849,614
ELECTRICAL INVERTER CIRCUITS

Filed Feb. 25, 1957  2 Sheets-Sheet 1

WITNESSES
Robert C. Baird
James F. Young

INVENTORS
George H. Royer &
Richard L. Bright.
BY
David M. Schiller
ATTORNEY

United States Patent Office 2,849,614
Patented Aug. 26, 1958

2,849,614

ELECTRICAL INVERTER CIRCUITS

George H. Royer, Highland, N. Y., and Richard L. Bright, Hempfield Township, Westmoreland County, Pa., assignors to Westinghouse Electric Corporation, East Pittsburgh, Pa., a corporation of Pennsylvania Application February 25, 1957, Serial No. 642,034

11 Claims. (Cl. 250—36)

This invention relates to electrical inverter circuits and has particular relation to inverter circuits of the self-excited type.

The present invention is a continuation-in-part of application Serial No. 421,350, filed April 6, 1954 by George H. Royer and Richard L. Bright which issued as Patent No. 2,783,384 on February 26, 1957. An inverter circuit described in the above-mentioned patent includes saturable magnetic core means connected for magnetization from a direct input quantity through a pair of current paths providing opposing directions of magnetization of the core means. A separate switch device is included in each of the paths having operating conditions which are transferable in phase opposition relative to each other in response to saturation of the core means. The core means includes output winding means for supplying to a pair of output terminals an alternating output quantity having a rectangular wave pattern with a frequency proportional to the frequency of saturation of the core means.

In the circuit described in the above-mentioned patent, the frequency of saturation of the core means is dependent upon the frequency of transfer of the operating conditions of the switch means, which is further dependent upon the magnitude of the input quantity. Consequently, the frequency of the output quantity is proportional to the magnitude of the input quantity. It has been observed that operation of such an inverter circuit may be adversely affected in applications where the ambient temperature is subject to variation. Such adverse operation is the result of a variation in the saturation flux density of the core means produced by changes in the ambient temperature. This causes the frequency of the alternating output quantity to vary by an amount dependent upon the change in the ambient temperature even though the magnitude of the input quantity is maintained at a constant value.

In accordance with the present invention, an improved electrical inverter circuit is provided including saturable magnetic core means for producing an alternating output quantity having a characteristic which is an indication of the magnitude of a unidirectional input quantity. The circuit is designed such that this characteristic is independent of variations in ambient temperature which affect operation of the core means.

In a preferred embodiment of the invention, an inverter circuit of the self-excited type is provided for producing from a pair of direct input quantities an alternating output quantity having positive and negative pulses with time durations dependent upon the magnitudes of the input quantities. It has been observed that with such an arrangement the ratio between the time durations of the positive and negative pulses of the output quantity is independent of variations in the ambient temperature to which the installation is subjected.

For this purpose one embodiment of the invention contemplates a system including a pair of direct input quantities connected in independent current paths for supplying to the core means a pair of magnetomotive forces acting in opposing directions. Each of the paths includes a separate switch device having operating conditions which are transferable in phase opposition relative to each other in response to saturation of the core means.

With this arrangement the positive pulses of the resulting alternating output quantity have a time duration which is inversely proportional to the magnitude of one of the input quantities whereas the time duration of each of the negative pulses is inversely proportional to the magnitude of the other one of the input quantities. The ratio between the time durations of the positive and negative pulses of the output quantity is therefore equal to the ratio between the magnitudes of the input quantities. Inasmuch as any change in the saturation flux density of the core means produced by a variation in ambient temperature affects the time duration of both the positive and negative pulses proportionally, the ratio between such time durations remains unaffected thereby permitting an accurate comparison of the magnitudes of the input quantities without regard to variations in ambient temperature.

A further embodiment of the invention provides a system including a pair of direct input quantities with only one input quantity connected in one of two current paths and with the other input quantity connected in both of the paths. With this arrangement, output pulses of one polarity may be caused to have a time duration which is dependent upon the algebraic sum of the magnitudes of the two input quantities whereas output pulses of the opposite polarity have a time duration dependent only upon the magnitude of the other direct input quantity.

With an arrangement as described, an alternating output quantity may readily be produced which has an asymmetrical wave form with positive and negative pulses of different time duration. This may be accomplished by selecting the input quantities such that the magnitudes of the input quantities are different with respect to each other. Such an asymmetrical wave form may be employed to advantage in many installations.

It is, therefore, an object of this invention to provide an improved electrical inverter circuit.

It is a further object of the invention to provide an improved electrical inverter circuit of the self-excited type.

It is a still further object of the invention to provide an improved electrical inverter circuit including saturable magnetic core means for producing an alternating output quantity having a characteristic providing an indication of the magnitude of a direct input quantity.

It is another object of the invention to provide an inverter circuit as defined in the preceding paragraph wherein said characteristic is independent of variations in ambient temperature which affect the operation of said core means.

It is still another object of the invention to provide an improved electrical system for producing an alternating output quantity having an asymmetrical wave form with positive and negative pulses of different time duration.

It is still another object of the invention to provide an electrical system including a pair of unidirectional input quantities with inverter means for producing from the input quantities an alternating output quantity having positive and negative pulses with time durations dependent upon the magnitudes of the input quantities.

Other objects of the invention will become apparent when taken in conjunction with the accompanying drawings, in which.

Figure 1:
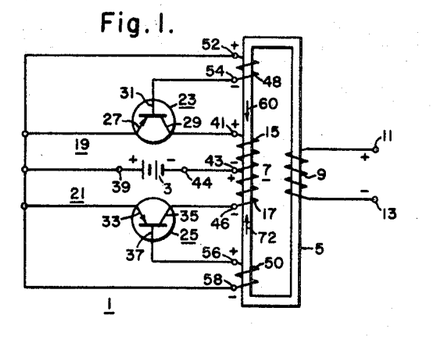
Figure 1 is a circuit diagram illustrating an electrical inverter circuit of the self-excited type.

Referring to the drawings, there is illustrated in Fig. 1 an electrical inverter circuit represented generally by the numeral 1. The circuit 1 includes a source of uni-directional voltage which is represented by the battery 3 for providing an input quantity which is to be inverted. The source 3 may comprise any suitable source of uni-directional voltage having either a constant or variable magnitude.

The circuit 1 includes translating means in the form of a magnetic core 5 which may be constructed of any suitable magnetic material. The core 5 is preferably formed of a material which exhibits substantially rectangular hysteresis characteristics. A number of such materials are commercially available at the present time. For example, the core 5 may be constructed of an alloy comprising approximately equal parts of nickel and iron. The core 5 is further designed for magnetic saturation within the range of energization thereof.

In order to permit magnetization of the core 5, suitable input winding means 7 are provided to link the core 5. An output winding 9 also links the core 5 in inductive relation with the winding means 7 for supplying an alternating output quantity to a pair of output terminals 11 and 13 which are connected to the winding 9. The output terminals 11 and 13 are energized in accordance with voltage induced in the winding 9 in response to energization of the winding means 7.

In order to permit magnetization of the core 5 in accordance with current of the source 3 for causing the induction of an alternating output voltage in the winding 9 the winding means 7 is shown in the form of a winding having two sections 15 and 17 preferably having equal numbers of turns. Each of the winding sections 15 and 17 is connected for energization from the source 3 through a separate current path to provide opposing directions of magnetization of the core 5. As illustrated in Fig. 1, the section 15 is included in a current path 19 whereas the section 17 is included in a current path 21.

For the purpose of controlling energization of the winding sections 15 and 17 from the source 3 a pair of switch devices 23 and 25 are included respectively in the paths 19 and 21. The devices 23 and 25 may take any suitable form. For example, the devices 23 and 25 may comprise electroresponsive valve devices such as three electrode vacuum tubes. Preferably, however, the switch devices are in the form of three electrode junction transistor devices. In Fig. 1, the transistors are illustrated in the form of PNP transistors with the transistor 23 having an emitter electrode 27, a collector electrode 29 and a base electrode 31. In a similar manner, the transistor 25 includes an emitter electrode 33, a collector electrode 35 and a base electrode 37.

The transistors are biased so as to operate as controlled switch devices with each transistor having a closed operating condition wherein the transistor exhibits a very low impedance condition between the emitter and collector electrodes, and an open operating condition wherein the transistor exhibits a very high impedance condition between the emitter and collector electrodes. In order to provide efficient operation of the circuit the transistors 23 and 25 are preferably operated to transfer between "saturated" and "cutoff" conditions.

As employed herein, the term "saturated" denotes a condition of a transistor wherein a further increase in the magnitude of forward current between the base and emitter electrodes has a negligible effect upon the magnitude of current between the emitter and collector electrodes. This saturated condition corresponds to the closed operating conditions of the transistors. The term "cutoff" as employed herein refers to a condition of a transistor wherein a further increase in the magnitude of reverse voltage between the base and emitter electrodes is ineffective to further decrease the magnitude of current between the emiter and collector electrodes. This cutoff condition corresponds to the open operating condition of the transistors.

As illustrated in Fig. 1, the emitter electrode 27 of the transistor 23 is connected to the positive terminal 39 of the source 3 whereas the collector electrode 29 is connected to the terminal 41 of the winding section 15. A center tap connection 43 of the winding means 7 is connected to the negative terminal 44 of the source 3. In a similar manner, the emitter electrode 33 of the transistor 25 is connected to the terminal 39 and the collector electrode 35 is connected to the terminal 46 of the winding section 17.

In order to control operation of the transistors 23 and 25, suitable control means are provided to establish opposing conducting conditions of the transistors. The control means is further effective to reverse the conducting conditions of the transistors in response to each occurrence of saturation of the core 5. The control means preferably comprises a pair of windings 48 and 50 which are provided to link the core 5 in inductive relation with the winding means 7. The windings 48 and 50 are connected respectively to apply voltages induced therein to the transistors 23 and 25 to establish opposing conducting conditions of the transistors. For this purpose, one terminal 52 of the winding 48 is connected to the emitter electrode 27 of the transistor 23 whereas the other terminal 54 of the winding 48 is connected to the base electrode 31 of the transistor 23. In a similar manner, the terminal 56 of the winding 50 is connected to the base electrode 37 of the transistor 25 with the terminal 58 of the winding 50 connected to the emitter electrode 33.

When the source 3 is connected in the circuit in the manner previously described, it has been observed that one of the transistors 23 and 25 will eventually assume a current conducting condition and that the other of the transistors will assume a non-current conducting condition. For purposes of discussion, it will be assumed that the transistor 23 is initially in a conducting condition and that the transistor 25 is in a non-conducting condition.

For this condition then, a substantial portion of current from the source 3 will flow through the emitter electrode 27, the collector electrode 29 and the winding section 15 back to the source 3. Such current flow through the winding section 15 establishes a magnetomotive force which directs magnetic flux through the core 5 in the direction indicated by the arrow 60. If the magnitude of voltage of the source 3 is assumed to be constant, then the resulting change in magnetic flux of the core 7 is at a constant rate thereby causing voltages of constant magnitudes to be induced in the winding sections 15 and 17 and the windings 9, 48 and 50. The polarities of these induced voltages are indicated by the plus and minus signs associated with the several windings. The voltages so induced in the windings 48 and 50 have polarities and magnitudes effective to establish respectively a saturated condition of the transistor 23 and a cutoff condition of the transistor 25.

Figure 2:
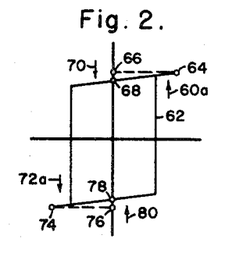
Fig. 2 is a graphical representation illustrating the hysteresis characteristics of a magnetic core employed in the circuit of Fig. 1.

In Fig. 2, there is illustrated a curve 62 which represents the hysteresis characteristics exhibited by the core 5. The curve 62 is plotted relative to ordinates which represent magnetic induction of the core 5 and abscissae which represent the magnetomotive force applied to the core 5. The arrow 60a in Fig. 2 indicates the direction of flux relative to the curve 62 corresponding to the core flux direction indicated by the arrow 60 of Fig. 1. The point of saturation of the core 5 caused by flux flowing in the direction of the arrow 60 of Fig. 1 is indicated by a point 64 on the curve 62 of Fig. 2. The magnitude of flux of the core 5 at the point of saturation 64 is indicated by a point 66 on the ordinate of Fig. 2.

Upon the occurrence of saturation of the core 5 caused by continued application of voltage of the source 3 to the winding section 15, the voltages induced in the sections 15 and 17 and the windings 9, 48 and 50 are reduced from the constant value thereof established during magnetization of the core 5 in the direction of the arrow 60 to a zero value. When this occurs, current flowing through the winding section 15 and the magnetomotive force established thereby is reduced to a zero value.

Such reduction of the magnetomotive force results in a decrease of the flux in the core 5 from the value thereof indicated by the point 66 to a value which is indicated by a point 68 of the curve 62. The point 68 represents the flux retentivity point of the core 5 for core saturation in the direction of the arrow 60a. This flux change is in a direction indicated by the arrow 70 of Fig. 2 which is opposite to the direction of flux change produced during magnetization of the core in the direction of the arrow 60a. The change in flux from the point 66 to the point 68 causes voltages to be induced in the windings 48 and 50 having polarities opposite to the polarities of the voltages induced in these windings during magnetization of the core in the direction of the arrow 60a. At the same time, the voltage so induced in the winding 50 initiates a transfer of the transistor 25 from a cutoff condition to a saturated condition. In Fig. 2, the slope of the portion of the curve 62 between the points 64 and 68 is exaggerated for purposes of illustration. However, in practice this slope is sufficient to provide a flux change between the points 66 and 68 for inducing voltage in the windings 48 and 50 having magnitudes effective to cause the desired switching operations.

When the transistor 25 is transferred to a saturated condition, a substantial portion of current from the source 3 flows through the emitter electrode 33, the collector electrode 35 and the winding section 17 back to the source 3 to establish a magnetomotive force which directs flux through the core 5 in the direction indicated by the arrow 72 of Fig. 1 which is opposite to the direction of the arrow 60. As the flux of the core is increased substantially constant voltages are induced in the windings 9, 48 and 50 and the winding sections 15 and 17 having polarities which are opposite to the polarities indicated in Fig. 1. The resulting voltage induced in the winding 48 maintains a cutoff condition of the transistor 23 whereas the voltage induced in the winding 50 maintains the saturated condition of the transistor 25.

In Fig. 2, the direction of flux relative to the curve 62 which corresponds to the direction indicated by the arrow 72 of Fig. 1 is indicated by the arrow 72a. The point of saturation of the core 5 caused by flux flowing in the direction of the arrow 72a is represented by the numeral 74 and the magnitude of flux of the core at the saturation point 74 is indicated by the point 76 on the ordinate of Fig. 2.

When the core 5 saturates as a result of continued application of voltage of the source 3 to the winding section 17, voltage induced in the sections 15 and 17 and the windings 9, 48 and 50 falls to a zero value. When this occurs, current flowing through the section 17 and the magnetomotive force established thereby are also reduced to a zero value. Such reduction of the magnetomotive force results in a decrease of the flux in the core from the value thereof indicated by the point 76 to a value which is indicated by a point 78 of the curve 62. The point 78 represents the flux retentivity point of the core for core saturation in the direction of the arrow 72a. This flux change is in a direction indicated by the arrow 80 of Fig. 2 which is opposite to the direction of flux change produced during magnetization of the core in the direction of the arrow 72a. The change in flux from the point 76 to the point 78 causes voltages to be induced in the windings 48 and 50 having polarities as indicated by the associated plus and minus signs of Fig. 1. Simultaneously, the voltage induced in the winding 48 is effective to initiate a transfer of the transistor 23 from a cutoff condition to a saturated condition. The slope of the portion of the curve 62 between the points 74 and 76 is exaggerated for purposes of illustration. In practice, however, this slope is sufficient to provide induced voltages effective to cause the desired switching operations. The cycle of operation of the circuit 1 as above described is then repeated.

It is observed that during a saturated condition of the transistor 23, a substantially constant voltage is induced in the winding 9 having a polarity as indicated by the associated plus and minus signs. When the transistor 25 is in a saturated condition, the voltage induced in the winding 9 has a polarity which is opposite to the polarity indicated in Fig. 1. Consequently, an alternating voltage having a rectangular wave pattern is induced in the winding 9 which has a frequency dependent upon the frequency of transfer of the transistors between saturated and cutoff conditions. Inasmuch as such a transfer is effected upon each occurrence of saturation of the core, the frequency of the voltage induced in the winding 9 is determined by the time required for flux of the core to change between the values represented by the points 66 and 76 of Fig. 2. The time required for such a flux change is dependent upon the magnitude of flux required to saturate the core and hence, upon the magnitude of voltage of the source 3. As a result, the frequency of voltage induced in the winding 9 is directly proportional to the magnitude of voltage of the source 3. This characteristic of the output voltage renders the circuit of Fig. 1 extremely useful in the field of telemetering where it is desired that the output frequency transmitted between a measuring point and a metering station represent an indication of the magnitude of a measured voltage quantity.

Figure 3:
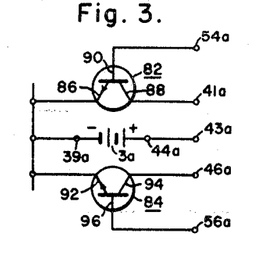
Figs. 3 and 4 are partial circuit diagrams illustrating different embodiments of the circuit of Fig. 1.

In Fig. 3 there is illustrated a partial circuit diagram of an inverter circuit of different construction than the circuit of Fig. 1. The circuit of Fig. 3 includes components which are similar to components found in the circuit of Fig. 1. For this reason, similar components of Figs. 1 and 3 are represented by the same reference numeral with the suffix "a" added in Fig. 3. In Fig. 3, a pair of transistors 82 and 84 of the NPN type are employed in place of the PNP transistors 23 and 25 utilized in the circuit of Fig. 1. For this arrangement, it is necessary to reverse the connections of the battery 3a to the emitter and collector electrodes from the connections shown in Fig. 1.

Figure 4:
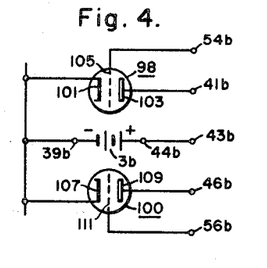

As illustrated in Fig. 4, the transistors 23 and 25 of the circuit of Fig. 1 are replaced by a pair of conventional vacuum tubes 98 and 100. Components of Fig. 4 which are similar to components of Fig. 1 are represented by the same reference numeral with the suffix "b" added. As shown in Fig. 4, a pair of triode tubes are provided with the tube 98 having a cathode 101, a plate 103 and a grid 105. The tube 100 includes a cathode 107, a plate 109 and a grid 111. The cathodes, grids and plates of the tubes 98 and 100 correspond respectively to the emitters, bases and collectors of the transistors 23 and 25 of Fig. 1. With such arrangement it is necessary to reverse the connections of the battery 3b from those shown in Fig. 1.

It has been observed that a substantially linear relationship exists between the magnitude of voltage of the source 3 and the frequency of the alternating voltage appearing across the output terminals 11 and 13 for a substantial range of values of voltage of the source 3. However, for relatively large magnitudes of voltage of the source 3, it has been noted that the frequency of the alternating output voltage deviates to a certain extent from the desired linear relationship. It is believed that such deviation is the result of excessive loading of the transistors 23 and 25 caused by the induction of relatively large voltages in the windings 48 and 50 by current flowing from the source 3 through the winding sections 15 and 17.

Figure 5:
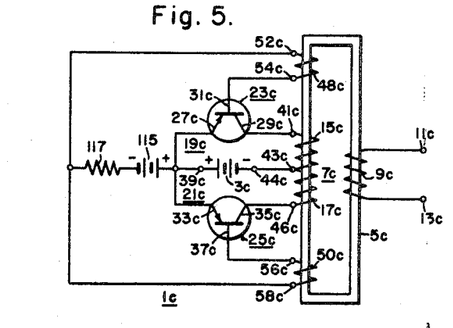
Figs. 5 and 6 are circuit diagrams illustrating still further embodiments of the circuit of Fig. 1.

In Fig. 5 there is illustrated a circuit 1c of different construction from the circuit 1 of Fig. 1 for producing an alternating output voltage having a frequency which is linearly related to the magnitude of voltage of the direct input quantity over a substantial range of values of the input voltage including relatively large values thereof. In Fig. 5 there is included a number of components which are similar to components of the circuit of Fig. 1. For this reason, similar components of Figs. 1 and 5 are represented by the same reference numeral with the suffix "c" added to the numerals of Fig. 5.

As shown in Fig. 5, the circuit 1c includes a source of biasing potential which is represented by a battery 115 having positive and negative terminals as indicated by the plus and minus signs associated with the battery. The positive terminal of the source 115 is connected to each of the emitter electrodes 27c and 33c of the transistors 23c and 25c whereas the negative terminal of the source 115 is connected through a series resistor 117 and through each of the windings 48c and 50c to the base electrodes 31c and 37c of the transistors.

The source 115 constitutes in effect a bias potential which is employed to supplement the potentials supplied by the windings 48c and 50c. For example, let it be assumed for purposes of illustration that the core 5 becomes saturated to thereby effect a reduction in the flux in the core from the point 66 to the point 68 of Fig. 2. This flux change causes a voltage to be induced in the winding 50c for initiating conduction of the transistor 25c as described in connection with Fig. 1. As transistor 25c begins to conduct, current from the source 115 flows through the emitter electrode 33c and the base electrode 37c to substantially increase conduction of transistor 25c to initiate the sequence of operations described in connection with Fig. 1.

The voltage induced in the winding 50c upon saturation of the core operates to apply the source 115 to the transistor 25c with the source 115 effecting a major portion of the biasing function. The source 115 together with the resistor 117 may be considered as constituting a constant current source which is applied between the base electrode 37c and the emitter electrode 33c of the transistor 25c to thereby prevent the flow of excessive current between these electrodes caused by relatively large voltages induced in the winding 50c by action of current from the source 3c. For this purpose the magnitude of voltage of the source 115 is selected to be large as compared to the values of the voltages induced in the windings 48c and 50c. It has been observed that with the arrangement shown in Fig. 5 the frequency of the resulting alternating output voltage appearing across the terminals 11c and 13c is substantially linear with respect to the magnitude of voltage of the source 3c over a substantial range of values of such voltage including relatively large values thereof. It has also been observed that provision of the battery 115 and resistor 117 assures starting of the circuit 1c by initiating conduction of one or the other transistors.

Figure 6:
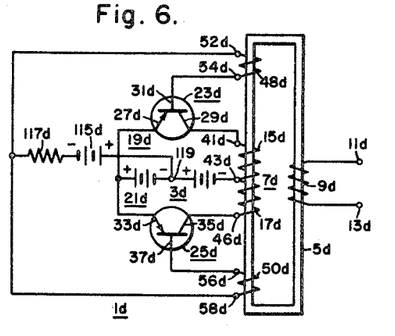

Operation of the inverter circuit may be further improved by means of the arrangement illustrated in Fig. 6 which differs from the arrangement of Fig. 5. Similar components of Figs. 5 and 6 are represented by the same reference numerals with the numerals of the components of Fig. 6 having the suffix "d" added.

As illustrated in Fig. 6, a portion of the source 3d is employed in conjunction with the source 115d as a biasing potential between the base and emitter electrodes of the transistors 23d and 25d. For this purpose, the positive terminal of the source 115d is connected to a center tap connection 119 of the source 3d such that the left-hand portion of the source 3d as viewed in Fig. 6 is applied between the base and emitter electrodes of the transistors cumulatively relative to the source 115d. With the arrangement of Fig. 6, it has been observed that an extremely linear relationship exists between the frequency of the resulting alternating output voltage and the magnitude of voltage of the source 3d even for large values of voltage of the source 3d. In certain applications the source 115d may be omitted if desired.

It is to be understood that the uni-directional input voltage sources shown in Figs. 1, 3, 4, 5 and 6 may be replaced by the combination (not shown) of an alternating input voltage and a series or bridge connected rectifier device. With such an arrangement, the conducting conditions of the switch devices will be reversed each time the time integral of the input voltage is sufficient to cause saturation of the core.

Figure 7:
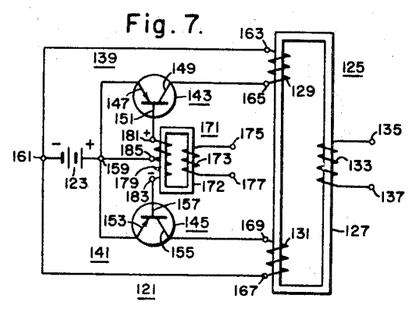
Fig. 7 is a circuit diagram illustrating an electrical inverter circuit of the externally excited type.

Referring now to Fig. 7, there is illustrated an inverter circuit 121 of the externally excited type which differs in construction from the self-excited circuits previously described. As shown in Fig. 7, the circuit 121 includes a source of uni-directional input voltage represented by a battery 123 which is to be inverted to provide an alternating output voltage having a rectangular wave pattern with a frequency which is dependent upon the frequency of an alternating biasing voltage described hereinafter. The circuit 121 includes translating means in the form of an output transformer 125 including a magnetic core 127 with a pair of input windings 129 and 131 linking the core in inductive relation. An output winding 133 links the core in inductive relation with the windings 129 and 131 to supply an alternating voltage to a pair of output terminals 135 and 137 in response to energization of the windings 129 and 131. The core 127 may be constructed of any suitable magnetic material. If desired, the core 127 may be of the type which exhibits rectangular hysteresis characteristics. Preferably, however, the core 127 is of conventional construction exhibiting conventional hysteresis loop characteristics.

In order to effect magnetization of the core 127, a pair of current paths 139 and 141 are connected for energization from the source 123 to supply current respectively to the input windings 129 and 131. In order to control energization of the paths 139 and 141, a pair of switch devices are provided which are illustrated in the form of transistors 143 and 145 of the PNP junction type. The transistor 143 includes an emitter electrode 147, a collector electrode 149 and a base electrode 151. In a similar manner, the transistor 145 includes an emitter electrode 153, a collector electrode 155 and a base electrode 157. The positive terminal of the source 123 is connected to the emitter electrodes 147 and 153 as indicated by the connection 159. The negative terminal 161 of the source 123 is connected to a terminal 163 of the winding 129 with the other terminal 165 of the winding 129 connected to the collector electrode 149 of the transistor 143. The negative terminal 161 of the source is also connected to a terminal 167 of the winding 131 with the other terminal 169 of the winding 131 connected to the collector electrode 155 of the transistor 145.

In order to control the operating conditions of the transistors 143 and 145, the circuit 121 includes a source of alternating voltage represented by a transformer 171 having a primary winding 173 to which is supplied an alternating input voltage through terminals 175 and 177. The transformer 171 includes further a secondary winding 179 having output terminals 181 and 183. The winding 179 includes a center tap connection 185. In order to permit proper biasing of the transistors 143 and 145, the terminals 181 and 183 of the winding 179 are connected respectively to the base electrodes 151 and 157 of the transistors with the center tap connection 185 connected to the emitter electrodes 147 and 153. In order to provide an efficient switching action, the voltage supplied by the transformer 171 preferably has a rectangular wave pattern and is of sufficient magnitude to alternately drive the transistors to saturated and cutoff current conducting conditions. The voltage supplied to the input terminals 175 and 177 of the transformer 171 may be derived from any suitable external source or it may be obtained from applying a portion of the alternating output voltage appearing across the terminals 135 and 137 to the terminals 175 and 177.

The operation of the circuit 121 may now be described. Let it be assumed that the alternating voltage appearing across the terminals 181 and 183 of the transformer 171 has an instantaneous polarity such that the terminal 181 is positive with respect to the terminal 183 as shown by the positive and negative signs associated with the winding 179. With this assumption, the base electrode 151 is at a positive potential relative to the emitter electrode 147 with the result that the transistor 143 is in a cutoff condition. However, the base electrode 157 is simultaneously at a negative potential with respect to the emitter electrode 153 with the result that the transistor 145 is in a saturated condition. This condition results in the application of the source 123 across the terminals 167 and 169 of the winding 131 to produce a first voltage pulse across the output terminals 135 and 137.

For the succeeding half cycle of voltage produced by the transformer 171, the polarities of the terminals 181 and 183 are reversed from those shown in Fig. 7. Consequently, the transistor 143 is in a saturated condition whereas the transistor 145 is in a cutoff condition. The source 123 is now applied across the terminals 163 and 165 of the winding 129 to produce a second voltage pulse across the terminals 135 and 137. The polarities of the connections of the windings 129, 131 and 133 are such that the second voltage pulse is of opposite polarity from the first voltage pulse. Consequently, for each complete cycle of voltage produced by the transformer 171, a complete cycle of voltage appears across the terminals 135 and 137 having a substantially rectangular wave pattern. The alternating output voltage has a frequency which is equal to the frequency of the voltage produced by the transformer 171 inasmuch as the frequency of the transformer voltage determines the frequency of reversals of the conducting conditions of the transistors which, in turn, determines the frequency of the alternating output voltage.

It is observed that the output transformer 125 includes a pair of input windings 129 and 131 providing a total of four input terminals 163, 165, 167 and 169. In practice, it may be desired to employ an output device having only two input terminals rather than four input terminals such as the device 125.

Figure 8:
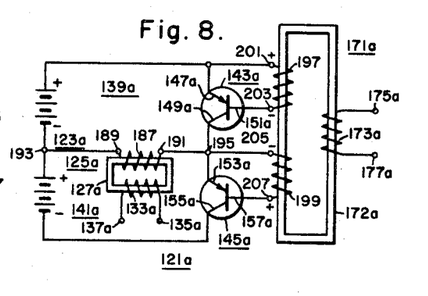
Figs. 8 and 9 are circuit diagrams illustrating different embodiments of the circuit of Fig. 7.

Referring now to Fig. 8, there is provided a circuit of different construction from the circuit of Fig. 7 which includes an output device having only two input terminals. Similar components of Figs. 7 and 8 are represented by the same reference numerals with the numerals of the components of Fig. 8 having the suffix "a." In Fig. 8, a uni-directional source of input voltage 123a is provided which includes two portions each connected in a separate one of the current paths 139a and 141a. An output device 125a is provided shown in the form of a transformer having a magnetic core 127a with an input winding 187 having only a pair of terminals 189 and 191. The transformer 125a further includes an output winding 133a with output terminals 135a and 137a.

In order to produce an alternating output voltage having a rectangular wave pattern the transformer 125a is connected as illustrated in Fig. 8. As there shown, the terminal 189 is connected to a point 193 which is intermediate the two portions of the source 123a with the terminal 191 of the winding 187 connected to the collector electrode 149a of the transistor 143a and to the emitter electrode 153a of the transistor 145a as indicated by the connection 195. In order to supply biasing potentials to the transistors, a suitable source of alternating voltage preferably having a rectangular wave pattern is provided. The source of biasing potential is shown in the form of a transformer 171a having an input winding 173a with input terminals 175a and 177a. The transformer 171a includes further a pair of output windings 197 and 199 each connected between the base and emitter electrodes of a separate one of the transistors. For this purpose, the emitter electrode 147a of the transistor 143a is connected to a terminal 201 of the winding 197 with the other terminal 203 of the winding 197 connected to the base electrode 151a. In a similar manner, the terminal 205 of the winding 199 is connected to the emitter electrode 153a of the transistor 145a with the terminal 207 connected to the base electrode 157a of the transistor 145a.

The polarities of the connections of the windings 197 and 199 are such that voltages induced in these windings in response to energization of the winding 173a are applied to the transistors 143a and 145a to establish opposing conducting conditions of the transistors. With this arrangement the conducting conditions of the transistors are reversed in phase opposition with respect to each other whereby a separate portion of the source 125a is applied across the winding 187 of the transformer 125a during each half cycle of the voltage produced by the transformer 171a. With the connections of the winding 187 illustrated in Fig. 8 an alternating voltage of rectangular wave pattern appears across the output terminals 135a and 137a in response to energization of the winding 187 of the transformer 171a. It is observed that for each complete cycle of voltage produced by the transformer 171a there is provided one complete cycle of voltage at the output terminals 135a and 137a. Consequently, this output voltage has a frequency which is equal to the frequency of the voltage produced by the transformer 171a.

Figure 9:
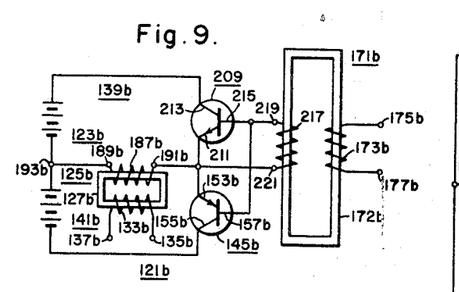

As previously stated, transistors may be employed which are either of the PNP or NPN type. In the embodiments of Figs. 7 and 8 previously described, transistors of the PNP type are utilized. Referring now to Fig. 9, there is illustrated an inverter circuit of the externally excited type which differs from the circuits of Figs. 7 and 8 in that one of the switching transistors is of the PNP type and the other of the transistors is of the NPN type. Similar components of Figs. 7, 8 and 9 are represented by the same reference numerals with the suffix "b" added to numerals of Fig. 9. As shown in Fig. 9, the circuit 121b includes a transistor 209 of the NPN type having an emitter electrode 211, a collector electrode 213 and a base electrode 215. An additional transistor 145b is provided which is of the PNP type including an emitter electrode 153b, a collector electrode 155b and a base electrode 157b.

In order to effect a reversal of the conducting conditions of the transistors 209 and 145b in phase opposition relative to each other, it is necessary that bias voltages be applied to the transistors such that the base electrodes of the transistors have the same polarity when the emitter electrodes of the transistors have the same polarity which is opposite to the polarity of the base electrodes. In order to provide this arrangement, a source of bias voltage is provided shown in the form of a transformer 171b including a magnetic core 172b having an output winding 217 with one terminal connected to each of the base electrodes of the transistors and with the other terminal connected to each of the emitter electrodes. As illustrated in Fig. 9, the terminal 219 of the winding 217 is connected to the base electrodes 215 and 157b whereas the terminal 221 of the winding 217 is connected to the emitter electrodes 211 and 153b. The transformer 171b includes further an input winding 173b having terminals 175b and 177b preferably supplied by alternating voltage of rectangular wave pattern. The operation of the circuit of Fig. 9 is similar to operation of the circuit of Fig. 8 and need not be described.

In certain installations it has been observed that operation of an inverter circuit of the type illustrated in Fig. 1 may be adversely effected due to variations in ambient temperature to which the installation is subjected. It has been noted that the frequency of the output voltage appearing across the terminals 11 and 13 of the circuit of Fig. 1 is dependent not only upon the magnitude of voltage of the source 3, but also upon the ambient temperature to which the circuit is subjected. Such variations are believed to be the result of a change in the saturation flux density of the magnetic core 5 produced in response to a change in the ambient temperature. This has the effect of altering the time required for core saturation which results in a variation in the frequency of the output voltage for a constant magnitude of the source 3. As a consequence, the frequency of the output voltage may not be a true indication of the magnitude of voltage of the source 3.

In accordance with the present invention an inverter circuit of improved construction is provided including saturable magnetic core means for producing an alternating output voltage having a characteristic which is an indication of the magnitude of a unidirectional input quantity. The improved circuit is designed such that this characteristic is independent of variations in ambient temperature which affect operation of the core means. To this end, an inverter circuit is provided for producing an alternating output voltage having positive and negative pulses with time durations which are dependent upon the magnitudes of a pair of unidirectional input voltages. The ratio between these time durations therefore provides an indication of the relationship between the magnitudes of the input voltages. With this arrangement, a variation in ambient temperature causing a change in the saturation flux density of the core results in proportional variations in the durations of the positive and negative pulses whereby the ratio between the time durations remains unaltered.

Figure 10:
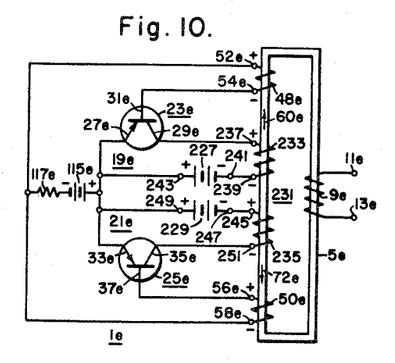
Fig. 10 is a circuit diagram illustrating an electrical inverter circuit of the self-excited type embodying the teachings of the present invention.

Referring now to Fig. 10, there is illustrated a circuit 1e which differs from the circuits of Figs. 1, 3, 4, 5 and 6 in that a pair of unidirectional voltage sources 227 and 229 are provided. As illustrated in Fig. 10, each of the input sources is connected in a separate one of two independent current paths with the source 227 included in the path 19e and with the source 229 included in the path 21e. As will presently appear, the arrangement illustrated in Fig. 10 is effective to produce an alternating voltage across the output terminals 11e and 13e having positive pulses each with a time duration inversely proportional to the magnitude of the source 227, and having negative pulses each with a time duration inversely proportional to the magnitude of the source 229.

In order to describe the operation of the circuit of Fig. 10, let it be assumed that the transistor 23e is in a saturated conducting condition and that the transistor 25e is in a cutoff conducting condition. Then, current from the source 227 flows from the positive terminal 243 through the emitter electrode 27e, the collector electrode 29e, the terminal 237 of the winding 233, the winding 233 and the terminal 239 of the winding 233 back to the negative terminal 241 of the source 227. Such current flow establishes a magnetomotive force which directs flux through the core 5e in the direction represented by the arrow 60e. As flux in this direction changes the core 5e is eventually magnetically saturated at which time voltages induced in the several windings by such flux change are reduced to a zero value. Such voltage reduction in the winding 48e results in the removal of the biasing voltage for the conducting transistor 23e with the result that this transistor approaches a cutoff condition such that current flow from the source 227 is also reduced to zero. Inasmuch as the time required for the core to attain a magnetically saturated condition is inversely proportional to the magnitude of voltage of the source 227, the time duration of the voltage pulse induced in the winding 9e by application of voltage of the source 227 to the winding 233 is also inversely proportional to the magnitude of the source 227.

When the core is saturated by continued application of voltage of the source 227 to the winding 233, the voltage induced in the winding 50e also falls to a zero value with the result that the transistor 25e begins to conduct to permit current flow from the source 229 through the emitter and collector electrodes of the transistor 225 and through the winding 235. Such current flow is in a direction to establish a magnetomotive force which directs flux through the core in the direction indicated by the arrow 72e. This direction is opposite to the direction indicated by the arrow 60e. As flux in such direction changes the core eventually attains a saturated condition at which time the voltages induced in the several windings fall to a zero value. Such voltage reduction is effective to transfer the conducting conditions of the transistors such that the transistor 23a again assumes a conducting condition and the transistor 25e assumes a cutoff condition. The time required for the core to saturate in response to flux flow in the direction of the arrow 72e is inversely proportional to the magnitude of the source 229 with the result that the negative voltage pulse induced in the winding 9e by changes in flux flowing in the direction of the arrow 72e has a time duration which is also inversely proportional to the magnitude of the source 229.

The circuit 1e may include a bias battery 115e and a series resistor 117e which correspond to the battery 115 and source 117 of Fig. 5. This arrangement provides a constant base current source as explained in connection with Fig. 5.

It is observed that with the arrangement of Fig. 10 the ratio between the time durations of the positive and negative pulses of the resulting alternating output voltage is equal to the ratio of the magnitudes of the sources 227 and 229. Consequently, if the magnitudes of the sources 227 and 229 are selected to be different, the amount of such difference may be indicated by a comparison of the time durations of the positive and negative pulses of the output voltage. This permits very accurate measurements of an unknown voltage. For example, one of the sources, such as the source 229, may comprises a source of voltage having a fixed known value. The other source of voltage may have an unknown value to be determined. By comparing the time durations of the output pulses the magnitude of the unknown voltage may be readily indicated with a high degree of accuracy.

Figure 11:
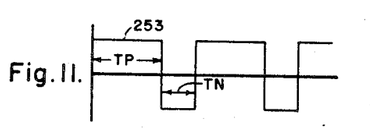
Figs. 11, 12 and 13 are graphical representations illustrating different configurations of the wave form of an output quantity derived from the circuit of Fig. 10.
Figure 12:
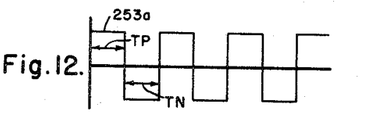
Figure 13:
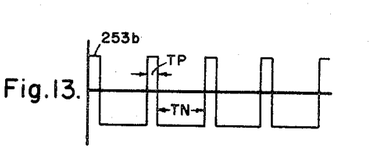

Referring to Figs. 11, 12 and 13, there are illustrated graphical representations of the wave form of the alternating output voltage for different relative values of the sources 227 and 229. For example, in Fig. 11, the curve 253 represents the wave form of the output voltage having positive pulses each with a time duration TP and having negative pulses each with a time duration TN. It is noted, with reference to Fig. 11, that the time duration of the positive pulses is substantially twice as great as the time duration of the negative pulses. Such a wave form would result when the magnitude of the source 229 was twice as great as the magnitude of the source 227.

In Fig. 12, the curve 253a represents the wave form of the output voltage for a condition wherein the magnitudes of the sources 227 and 229 are substantially equal. For this condition, it is noted that the time duration of the positive pulses is substantially equal to the time duration of the negative pulses. In Fig. 13, the curve 253b represents the wave form of the output voltage for a condition wherein the magnitude of the source 227 is on the order of four times the magnitude of the source 229 resulting in the provision of positive pulses having approximately one-fourth the time duration of the negative pulses.

A measurement or comparison from the output voltage may be obtained in any suitable manner. For example, the output voltage may be applied to an oscillograph to permit a visual observance of the pulse widths. The output voltage may also be applied to suitable integrating circuits for producing electrical quantities proportional to the integrals of the positive and negative pulses.

By inspection of Figs. 11, 12 and 13, it is noted that a reliable indication of the relative magnitudes of two direct input quantities is obtained by means of the circuit 1e of Fig. 10. The indication provided by the circuit of Fig. 10 is unaffected by variations in ambient temperature which affect operation of the core 5e. Such variations merely result in a proportionate change in the time of duration of the pulses without disturbing the ratio between such times of duration. It is noted further that by providing two direct input sources of different values the circuit of Fig. 10 is capable of supplying an alternating voltage of rectangular asymmetrical wave form having positive and negative pulses of different time durations. A voltage of such a nature may be employed to advantage in many applications.

Figure 14:
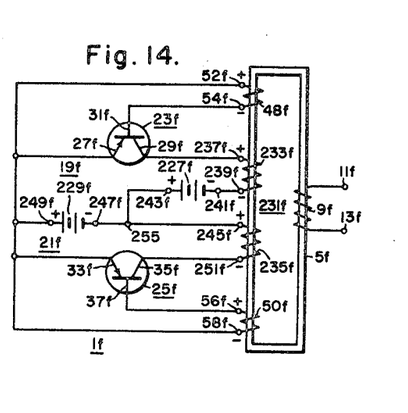
Fig. 14 is a circuit diagram illustrating a different embodiment of the circuit of Fig. 10.

Referring now to Fig. 14, there is illustrated a circuit 1f which differs in construction from the circuit 1e of Fig. 10 in the provision of two direct input sources connected such that the time of duration of pulses of one polarity of the output voltage is dependent upon the algebraic sum of the magnitudes of the input sources. For this purpose, connections of the two sources are made such that both of the sources are included in one of the paths with only one of the sources being connected in the remaining path. For example, as shown in Fig. 14 the sources 227f and 229f are connected in series in the path 19f whereas the source 229f only is connected in the path 21f.

It is observed that with this arrangement when the transistor 23f is in a saturated condition the winding 233f is energized in accordance with a voltage dependent upon both the magnitude and polarity of the source 227f whereas when the transistor 25f is in a saturated condition a voltage dependent only upon the magnitude of the source 229f is applied to the winding 235f. If desired, the circuit 1f may include a constant base current source similar to the current source comprising the battery 115e and resistor 117e of Fig. 10.

With the circuit of Fig. 14 both the polarity and magnitude of a voltage quantity may be determined. For example, it has been observed that the times of duration of the positive and negative pulses of the output voltage of Fig. 14 are substantially equal when the voltage of source 227f is zero. If such voltage has the polarity shown in Fig. 14 the time of duration of the positive pulses is less than that of the negative pulses whereas the time duration of the positive pulses is greater than that of the negative pulses when voltage of the source 227f has polarity opposite from that shown. The magnitude of voltage of the source 227f may also be indicated by a determination of the amount by which the time duration of the positive pulses is greater or less than the time duration of the negative pulses.

Although the invention has been described with reference to certain specific embodiments thereof, numerous modifications are possible and it is desired to cover all modifications falling within the spirit and scope of the invention.

We claim as our invention:

1. In an electrical system, a pair of output terminals, first and second unidirectional input voltage sources, first and second electrical paths, said first source being connected in said first path to energize the first path, said second source being connected in said second path to energize said second path, saturable magnetic core means, said paths being effective when energized from said sources to supply magnetomotive forces to said core means which act in opposing directions, a separate electrical switch device included in each of said paths, each of said switch devices being operable to transfer the associated path between a conductive condition and a substantially non-conductive condition, switch operating means effective in response to saturation of said core means produced by a conductive condition of said first path while the second path is in a substantially non-conductive condition to operate said switch devices for reversing the conductive conditions of said paths, said switch operating means being additionally effective in response to saturation of said core means produced by a conductive condition of said second path while said first path is in a substantially non-conductive condition to operate said switch devices for reversing the conductive conditions of said paths, and output winding means linking said core means to deliver to said output terminals alternating voltage induced therein, said alternating voltage having positive pulses each with a time duration dependent upon the magnitude of the first input voltage, and having negative pulses each with a time duration dependent upon the magnitude of the second input voltage.

2. In an electrical system, a pair of output terminals, first and second unidirectional input voltage sources, first and second electrical paths, said first source being connected in said first path to energize the first path, said second source being connected in said second path to energize said second path, saturable magnetic core means constructed of material exhibiting substantially rectangular hysteresis loop characteristics, said paths being effective when energized from said sources to supply magnetomotive forces to said core means which act in opposing directions, a separate electrical switch device included in each of said paths, each of said switch devices being operable to transfer the associated path between a conductive condition and a substantially non-conductive condition, switch operating means effective in response to saturation of said core means produced by a conductive condition of said first path while the second path is in a substantially non-conductive condition to operate said switch devices for reversing the conductive conditions of said paths, said switch operating means being additionally effective in response to saturation of said core means produced by a conductive condition of said second path while said first path is in a substantially non-conductive condition to operate said switch devices for reversing the conductive conditions of said paths, and output winding means linking said core means to deliver to said output terminals alternating voltage induced therein, said alternating voltage having positive pulses each with a time duration dependent upon the magnitude of the first input voltage, and having negative pulses each with a time duration dependent upon the magnitude of the second input voltage.

3. In an electrical system, a pair of output terminals, first and second unidirectional input voltage sources, first and second electrical paths, said first source being connected in said first path to energize the first path, said second source being connected in said second path to energize said second path, saturable magnetic core means, said paths being effective when energized from said sources to supply magnetomotive forces to said core means which act in opposing directions, a pair of semiconductor devices each having a base electrode, an emitter electrode and a collector electrode, the emitter and collector electrodes of each of said devices being included in a separate one of said paths, each of said devices being operable to transfer the associated path between a conductive condition and a substantially non-conductive condition, control means effective in response to saturation of said core means produced by a conductive condition of one of said paths while the other of said paths is in a substantially non-conductive condition to apply biasing potentials between the base electrode and one of the emitter and collector electrodes of each of said devices to operate said devices for reversing the conductive conditions of said paths, said control means being additionally effective in response to saturation of said core means produced by a conductive condition of said other of said paths while said one of said paths is in a substantially non-conductive condition to apply biasing potentials between the base electrode and one of the emitter and collector electrodes of each of said devices to operate said devices for reversing the conductive conditions of said paths, and output winding means linking said core means to deliver to said output terminals alternating voltage induced therein, said alternating voltage having positive pulses each with a time duration dependent upon the magnitude of the first input voltage, and having negative pulses each with a time duration dependent upon the magnitude of the second input voltage.

4. In an electrical system, a pair of output terminals, first and second unidirectional input voltage sources, first and second electrical paths, said first source being connected in said first path to energize the first path, said second source being connected in said second path to energize said second path, saturable magnetic core means constructed of material exhibiting substantially rectangular hysteresis loop characteristics, said paths being effective when energized from said sources to supply magnetomotive forces to said core means which act in opposing directions, a pair of semi-conductor devices each having a base electrode, an emitter electrode and a collector electrode, the emitter and collector electrodes of each of said devices being included in a separate one of said paths, each of said devices being operable to transfer the associated path between a conductive condition and a substantially non-conductive condition, control means effective in response to saturation of said core means produced by a conductive condition of one of said paths while the other of said paths is in a substantially non-conductive condition to apply biasing potentials between the base electrode and one of the emitter and collector electrodes of each of said devices to operate said devices for reversing the conductive conditions of said paths, said control means being additionally effective in response to saturation of said core means produced by a conductive condition of said other of said paths while said one of said paths is in a substantially non-conductive condition to apply biasing potentials between the base electrode and one of the emitter and collector electrodes of each of said devices to operate said devices for reversing the conductive conditions of said paths, and output winding means linking said core means to deliver to said output terminals alternating voltage induced therein, said alternating voltage having positive pulses each with a time duration dependent upon the magnitude of the first input voltage, and having negative pulses each with a time duration dependent upon the magnitude of the second input voltage.

5. In an electrical system, a pair of unidirectional input voltage sources, magnetic core means, first, second and third winding means linking the core means in inductive relation relative to one another, a pair of semiconductor devices each including a base electrode, an emitter electrode and a collector electrode, said first winding means being connected for energization from said voltage sources through separate paths effecting opposing directions of magnetization of said core means, and a pair of output terminals energizable from said second winding means, each of said paths including the emitter and collector electrodes of a separate one of said devices, said core means being proportioned for saturation within the range of energization of said first winding means, said third winding means being connected to apply voltages induced therein between the base electrode and one of the emitter and collector electrodes of each of said devices, each of said devices having a cutoff current conducting condition between the emitter and collector electrodes for one polarity of said induced voltages, and a saturated current conducting condition between the emitter and collector electrodes for the opposite polarity of said induced voltages, said third winding means being connected to apply said induced voltages with polarities effective to establish opposing current conducting conditions of said devices, each of said devices being biased so as to transfer from one to the other of said current conducting conditions in response to voltages induced in said third winding means upon each occurrence of saturation of said core means, said second winding means delivering to said output terminals alternating voltage induced therein, said alternating voltage having positive pulses each with a time duration dependent upon the magnitude of one of said input voltages, and having negative pulses each with a time duration dependent upon the magnitude of the other of said input voltages.

6. In an electrical system, a pair of output terminals, a pair of unidirectional input voltages, a pair of independent electrical paths each connected for energization from only a separate one of said input voltages, saturable magnetic core means, said paths being effective when energized from said sources to supply magnetomotive forces to said core means which act in opposing directions, a separate electrical switch device included in each of said paths, each of said switch devices being operable to transfer the associated path between a conductive condition and a substantially non-conductive condition, switch operating means effective in response to saturation of said core means produced by a conductive condition of said first path while the second path is in a substantially non-conductive condition to operate said switch devices for reversing the conductive conditions of said paths, said switch operating means being additionally effective in response to saturation of said core means produced by a conductive condition of said second path while said first path is in a substantially non-conductive condition to operate said switch devices for reversing the conductive conditions of said paths, and output winding means linking said core means to deliver to said output terminals alternating voltage induced therein, said alternating voltage having positive pulses each with a time duration which is inversely proportional to the magnitude of the input voltage energizing one of said paths, and having negative pulses each with a time duration which is inversely proportional to the magnitude of the input voltage energizing the other of said paths.

7. In an electrical system, a pair of output terminals, a pair of unidirectional input voltages, a pair of independent electrical paths each connected for energization from only a separate one of said input voltages, saturable magnetic core means, said paths being effective when energized from said input voltages to supply magnetomotive forces to said core means which act in opposing directions, a pair of semiconductor devices each having a base electrode, an emitter electrode and a collector electrode, the emitter and collector electrodes of each of said devices being included in a separate one of said paths, each of said devices being operable to transfer the associated path between a conductive condition and a substantially non-conductive condition, control means effective in response to saturation of said core means produced by a conductive condition of one of said paths while the other of said paths is in a substantially non-conductive condition to apply biasing potentials between the base electrode and one of the emitter and collector electrodes of each of said devices to operate said devices for reversing the conductive conditions of said paths, said control means being additionally effective in response to saturation of said core means produced by a conductive condition of said other of said paths while said one of said paths is in a substantially non-conductive condition to apply biasing potentials between the base electrode and one of the emitter and collector electrodes of each of said devices to operate said devices for reversing the conductive conditions of said paths, and output winding means linking said core means to deliver to said output terminals alternating voltage induced therein, said alternating voltage having positive pulses each with a time duration which is inversely proportional to the magnitude of the input voltage energizing one of said paths, and having negative pulses each with a time duration which is inversely proportional to the magnitude of the input voltage energizing the other of said paths.

8. In an electrical system, a pair of output terminals, first and second unidirectional input voltage sources, first and second electrical paths, said first source being connected to energize each of said paths, said second source being connected to energize only said first path, saturable magnetic core means, said paths being effective when energized from said sources to supply magnetomotive forces to said core means which act in opposing directions, a separate electrical switch device included in each of said paths, each of said switch devices being operable to transfer the associated path between a conductive condition and a substantially non-conductive condition, switch operating means effective in response to saturation of said core means produced by a conductive condition of said first path while the second path is in a substantially non-conductive condition to operate said switch devices for reversing the conductive conditions of said paths, said switch operating means being additionally effective in response to saturation of said core means produced by a conductive condition of said second path while said first path is in a substantially non-conductive condition to operate said switch devices for reversing the conductive conditions of said paths, and output winding means linking said core means to deliver to said output terminals alternating voltage induced therein, said alternating voltage having pulses of one polarity each with a time duration inversely proportional to the algebraic sum of the magnitudes of said first and second sources, and having pulses of the opposite polarity each with a time duration inversely proportional to the magnitude only of said first source.

9. In an electrical system, a pair of output terminals, first and second unidirectional input voltage sources, first and second electrical paths, said first source being connected to energize each of said paths, said second source being connected to energize only said first path, saturable magnetic core means, said path being effective when energized from said sources to supply magnetomotive forces to said core means which act in opposing directions, a pair of semiconductor devices each having a base electrode, an emitter electrode and a collector electrode, the emitter and collector electrodes of each of said devices being included in a separate one of said paths, each of said devices being operable to transfer the associated path between a conductive condition and a substantially non-conductive condition, control means effective in response to saturation of said core means produced by a conductive condition of one of said paths while the other of said paths is in a substantially non-conductive condition to apply biasing potentials between the base electrode and one of the emitter and collector electrodes of each of said devices to operate said devices for reversing the conductive conditions of said paths, said control means being additionally effective in response to saturation of said core means produced by a conductive condition of said other of said paths while said one of said paths is in a substantially non-conductive condition to apply biasing potentials between the base electrode and one of the emitter and collector electrodes of each of said devices to operate said devices for reversing the conductive conditions of said paths, and output winding means linking said core means to deliver to said output terminals alternating voltage induced therein, said alternating voltage having pulses of one polarity each with a time duration inversely proportional to the algebraic sum of the magnitudes of said first and second sources, and having pulses of the opposite polarity each with a time duration inversely proportional to the magnitude only of said first source.

10. In an electrical system, a pair of output terminals and means for delivering to said output terminals an alternating output voltage having an asymmetrical rectangular wave form with positive and negative pulses of different time duration, said means including saturable magnetic core means, means for applying a first magnetomotive force of constant first magnitude to said core means acting in a first direction, means for applying a second magnetomotive force of constant second magnitude different from the first magnitude to said core means acting in a second direction opposite to said first direction, control means for controlling the application of said magnetomotive forces to said core means, said control means being effective to substantially simultaneously terminate the application of said first magnetomotive force and initiate the application of said second magnetomotive force in response to saturation of said core means in said first direction, said control means being additionally effective to substantially simultaneously terminate the application of said second magnetomotive force and initiate the application of said first magnetomotive force in response to saturation of said core means in said second direction, and output winding means linking said core means to deliver to said output terminals alternating voltage induced therein.

11. In an electrical system, a pair of output terminals, first and second unidirectional input voltage sources, and means for delivering to said output terminals an alternating output voltage having a rectangular wave form with positive pulses of time duration dependent on the magnitude of said first source, and with negative pulses of time duration dependent on the magnitude of said second source, said means including saturable magnetic core means, means for applying a first magnetomotive force to said core means having a magnitude proportional to the magnitude of said first source acting in a first direction, means for applying a second magnetomotive force to said core means having a magnitude proportional to the magnitude of said second source acting in a second direction opposite to said first direction, control means for controlling the application of said magnetomotive forces to said core means, said control means being effective to substantially simultaneously terminate the application of said first magnetomotive force and initiate the application of said second magnetomotive force in response to saturation of said core means in said first direction, said control means being additionally effective to simultaneously terminate the application of said second magnetomotive force and initiate the application of said first magnetomotive force in response to saturation of said core means in said second direction, and output winding means linking said core means to deliver to said output terminals alternating voltage induced therein.

No references cited.